(12) United States Patent  
Chen et al.

(10) Patent No.: US 9,071,573 B2  
(45) Date of Patent: Jun. 30, 2015

(54) METHOD AND SYSTEM FOR PROVIDING ARTICLE INFORMATION

(71) Applicant: INSTITUTE FOR INFORMATION INDUSTRY, Taipei (TW)

(72) Inventors: Ping-I Chen, Taipei (TW); Shi-Jen Lin, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 241 days.

(21) Appl. No.: 13/771,052

(22) Filed: Feb. 19, 2013

(65) Prior Publication Data

US 2014/0122521 A1 May 1, 2014

(30) Foreign Application Priority Data

Oct. 26, 2012 (TW) .............................. 101139847 A

(51) Int. Cl.
*G06F 17/30* (2006.01)
*H04L 29/08* (2006.01)

(52) U.S. Cl.
CPC ...................................... *H04L 67/02* (2013.01)

(58) Field of Classification Search
None
See application file for complete search history.

(56) References Cited

U.S. PATENT DOCUMENTS

| 2008/0010269 A1* | 1/2008 | Parikh .............................. 707/5 |
| 2009/0024718 A1* | 1/2009 | Anagnostopoulos et al. 709/218 |
| 2011/0302152 A1* | 12/2011 | Boyd et al. ..................... 707/722 |

FOREIGN PATENT DOCUMENTS

| TW | 548557 B | 8/2003 |
| TW | 200519638 A | 6/2005 |

* cited by examiner

*Primary Examiner* — Robert Beausoliel, Jr.
*Assistant Examiner* — Hau H Hoang
(74) *Attorney, Agent, or Firm* — CKC & Partners Co., Ltd.

(57) ABSTRACT

A method for providing article information includes the following steps: an article request for obtaining an article to be read is received through a network from a present client. The article is analyzed to obtain several potential keywords from the article. An internal database is searched to obtain at least one representative keyword, which the potential words belong to, and transformation information between the at least one representative keyword and each potential keyword. A number of search results of the at least one representative keyword is obtained by searching an external database for calculating a number of search results of each potential keyword. Article-related information related to the article is generated according to the number of search results of the potential keywords. The article and the article-related information are combined to generate a web page for being transmitted to the present client through the network.

4 Claims, 2 Drawing Sheets

METHOD AND SYSTEM FOR PROVIDING ARTICLE INFORMATION

RELATED APPLICATIONS

This application claims priority to Taiwan Application Serial Number 10139847, filed Oct. 26, 2012, which is herein incorporated by reference.

BACKGROUND

1. Technical Field

The present invention relates to a method and system for providing article information. More particularly, the present invention relates to a method, and system for providing article information with reduced dependency of an external database.

2. Description of Related Art

As digital age comes, it is a trend to digitalize all kinds of information. Hence, any people rely on electrical devices to acquire information, knowledge and communicate with others. People also get used to reading digital information, such as web pages and e-books, through electrical devices.

In general, electrical devices provide contents on web pages or e-books directly. If readers want acquire further information related to contents on web pages or e-books, they have to open search pages and input related keywords for search, which is not convenient.

Accordingly, there is a need to provide contents of web pages or e-books with related information at the same time.

SUMMARY

According to one embodiment of this invention, a method for providing article information is provided to reduce the number to search an external database by providing an internal database. The method for providing article information includes the following steps:

(a) An article request for obtaining an article to be read is received through a network from a present client.

(b) The article is analyzed to obtain several potential keywords from the article.

(c) An internal database is searched to obtain at least one representative keyword, which the potential words belong to, and transformation information between the at least one representative keyword and each potential keyword.

(d) A number of search results of the at least one representative keyword is obtained by searching for the at least one representative keyword in an external database.

(e) A number of search results of each potential keyword is calculated according to the number of search results of the at least one representative keyword and the transformation information of each potential keyword respectively.

(f) Article-related information related to the article is generated according to the number of search results of the potential keywords.

(g) The article and the article-related information are combined to generate a web page, and the web page is transmitted to the present client through the network.

According to another embodiment of this invention, a system for providing article information is disclosed. The system for providing article information includes an internal database, a network unit and a processing unit. The processing unit is electrically connected to the internal database and the network unit. The processing unit includes a request receiving module, an analyzing module, an internal-database searching module, an external-database searching module, a calculating module and a web-page processing module. The request receiving module receives an article request for obtaining an article to be read through the network from a present client. The analyzing module analyzes the article to obtain several potential keywords from the article. The internal-database searching module searches the internal database to obtain at least one representative keyword, which the potential words belong to, and transformation information between the at least one representative keyword and each potential keyword. The external-database searching module obtains a number of search results of the at least one representative keyword by searching for the at least one representative keyword in an external database through the network. The calculating module calculates a number of search results of each potential keyword according to the number of search results of the at least one representative keyword and the transformation information of each potential keyword respectively. The web-page processing module generates article-related information related to the article according to the number of search results of the potential keywords. The web-page processing module combines the article with the article-related information to generate a web page, and transmits the web page to the present client through the network.

The present invention can achieve many advantages. The article to be read can be provided with its related information. In addition, with the internal database, the number for searching the external database can be reduced.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
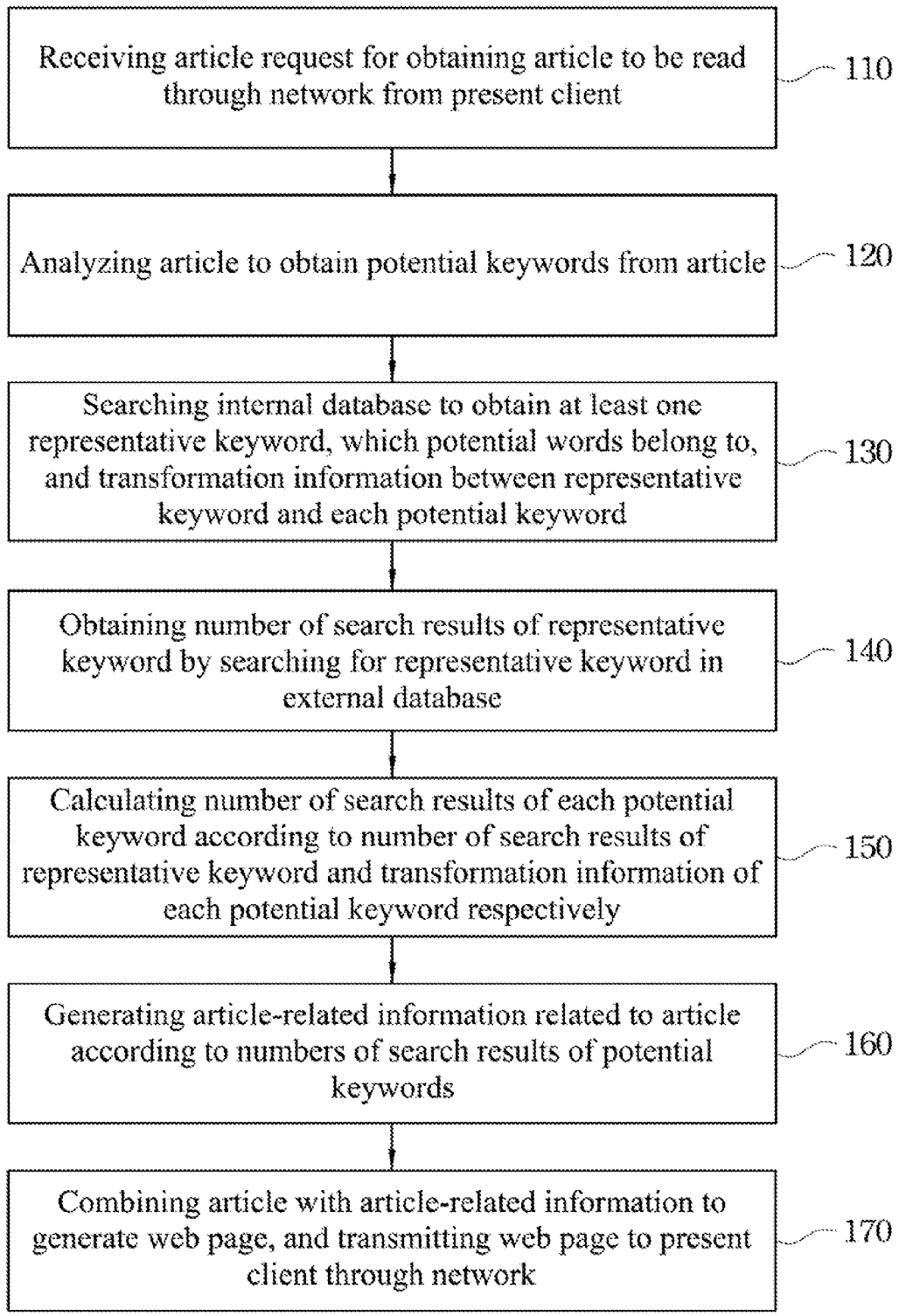
FIG. 1 is a flow diagram of a method for providing article information according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for providing article information according to one embodiment of this invention. In the method for providing article information, an internal database is provided for reducing the number to search an external database. In some embodiments, the method for providing article information may be carried out by running a computer program which is stored on a computer-readable storage medium having computer-readable instructions embodied in the medium, such that computers (for example, servers, personal computers, industrial computers, embedded systems, etc.) can read the computer program and carry out the method for providing article information. Any suitable storage medium (such as non-transitory medium) may be used. For example, suitable storage medium can be non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); or magnetic storage devices such as hard disk drives (HOD) and floppy disk drives.

The method for providing article information 100 includes the following steps:

At step 110, an article request for obtaining an article to be read is received through a network from a present client. In other words when a user of the present client want to read an article, he/she can operate the present client to generate the corresponding article request for the reception at step 110. The present client may be a computer, a mobile device or any other device able to connecting to the network.

At step 120, the article is analyzed to obtain several potential keywords from the article. In one embodiment of step 120, a word-segmentation algorithm may be applied to segment words captured from the article into several terms, which is taken as the potential keywords. In some embodiments, only the terms, which are determined as nouns, may be taken as the potential keywords.

At step 130, an internal database is searched to obtain at least one representative keyword, which the potential words belong to, and transformation information between the at least one representative keyword and each potential keyword. In some embodiments, the internal database may be set up utilizing a word level technology, which discovers relation of subordination between several preset words in the internal database. A word term, which is at the highest word level, can be taken as a representative keyword, which can represents a concept of the uppermost in its word category in the internal database. Hence, in some embodiments of step 130, the representative keyword, which represents the word category of the potential keywords, can be obtained from the internal database. Since terms in one single article may be similar or the same, the number of the representative keyword obtained at step 130 is less than or the same as the number of the potential keywords.

At step 140, a number of search results of the at least one representative keyword is obtained by searching for the at least one representative keyword in an external database. For example, several potential keywords "A" and "B" is obtained at step 120, and then a representative keyword "C", which can represent the potential words "A" and "B". Accordingly, only the number of search results of the representative keyword "C" should be obtained by searching for the representative keyword "C" in the external database at step 140. Therefore, there is no need to search for all potential keywords, which can reduce the number for searching the external database and avoid being blocked by the external database due to searching for too many times.

At step 150, a number of search results of each potential keyword is calculated according to the number of search results of the at least one representative keyword and the transformation information of each potential keyword respectively. In one embodiment of this invention, the transformation information of each potential keyword may include the ratio of the number of search results of the potential keyword to the number of search results of its representative keyword. For example, if the ratio of the number of search results of the potential keyword "A" to the number of search results of its representative keyword "C" is 1:10 and the number of search results of representative keyword "C" in the external database is 10,000, the number of search results of the potential keyword "A" in the external database may be 1,000 (=10000/10).

At step 160, article-related information related to the article is generated according to the number of search results of the potential keywords. In one embodiment of this invention, step 160 may include the following operations: the potential keywords may be combined to generate several potential keyword sets. A word-relation parameter of each potential keyword set may be calculated according to the number of search results of the potential keywords. One of the potential keywords may be selected for representing the article according to the word-relation parameters of the potential keyword sets. Subsequently, the external database may be searched utilizing the selected keyword for representing the article to obtain the article-related information related to the article. In some embodiments, Normalized Google Distance (NGD) algorithm or any other method for calculating word-relation (word similarity) parameters may be utilized to calculate the word-relation parameter of each potential keyword set. The formula for calculating the word-relation parameter of each potential keyword set with NGD algorithm may be:

$$NGD(x, y) = \frac{\max\{\log f(x), \log f(y)\} - \log f(x, y)}{\log N - \min\{\log f(x), \log f(y)\}}$$

wherein, NGD(x, y) is the word-relation parameter of the potential keyword set, f(x) is the number of search results of the potential keyword x, f(y) is the number of search results of the potential keyword y, f(x, y) is the number of search results of the potential keyword set (x, y). When the value of NGD(x, y) is close to 0, there is a good possibility that the potential keywords x, y of this potential keyword set show in the same article; in contract, when the value of NGD(x, y) is large, there is a good possibility that the potential keywords x, y of this potential keyword set do not show in the same article. Accordingly, the word-relation parameter of the potential keyword set can be taken as the relation weight between the potential keywords of the same potential keyword set, and one of the potential keywords for representing the article can be selected according to the word-relation parameters of the potential keyword sets utilizing any weight-related algorithm.

At step 170, the article and the article-related information are combined to generate a web page, and the web page is transmitted to the present client through the network. In some embodiments of step 170, the article-related information can be placed on the side of the article to form a web page. In another embodiment, the article-related information may be noted on the corresponding partition of the article. Therefore, the article to be read can be provided with its related information. In addition, with the internal database, the number for searching the external database can be reduced.

Furthermore, when step 130 is performed, if there is the at least one representative keyword, which each potential keyword belong to, stored in the internal database may be further determined. When there is no representative keyword, which one of the potential keywords belong to, stored in the internal database, the number of search results of the potential keyword belonging to no representative keyword can be obtained by searching for the potential keyword belonging to no representative keyword in the external database.

In some embodiments of this invention, searching results of the members, who join the same social network with the present client, can be further utilized. Hence, the method for providing article information 100 may further include the following steps: information of at least one social network joined by the present client may be obtained. Wherein, the social network includes several social-network-member clients, and the social network includes a social network database. When at least one of the social-network-member clients performs an external search to the external database, the result of the external search may be recorded in the social network database. Hence, the number of search results of the potential keywords from the social network database.

In some embodiments of this invention, the internal database may be set up according to the relation degrees between the preset words in the internal database. Wherein, conditional probabilities can be utilized to represent the relation degrees between the preset words in the internal database, the formula for which may be:

$$CP(m \to n) = \frac{\log f(m, n)}{\log f(n)}$$

$$CP(n \to m) = \frac{\log f(m, n)}{\log f(m)}$$

wherein, CP(m→n) is the conditional probability that the preset word n shows when the preset word m shows, CP(n→m) is the conditional probability that the preset word m shows when the preset word n shows, f(m) is the number of search results of the preset word m, f(n) is the number of search results of the preset word n, f(x, y) is the number of search results of the preset words (m, n). Hence, the relation of subordination between the preset words in the internal database can be set up according to the relation degrees between the preset words in the internal database.

In another embodiment of this invention, the relation of subordination between the preset words in the internal database can be estimated according to the PageRank of each preset word, and the internal database can be set up according to the relation of subordination between the preset words.

Figure 2:
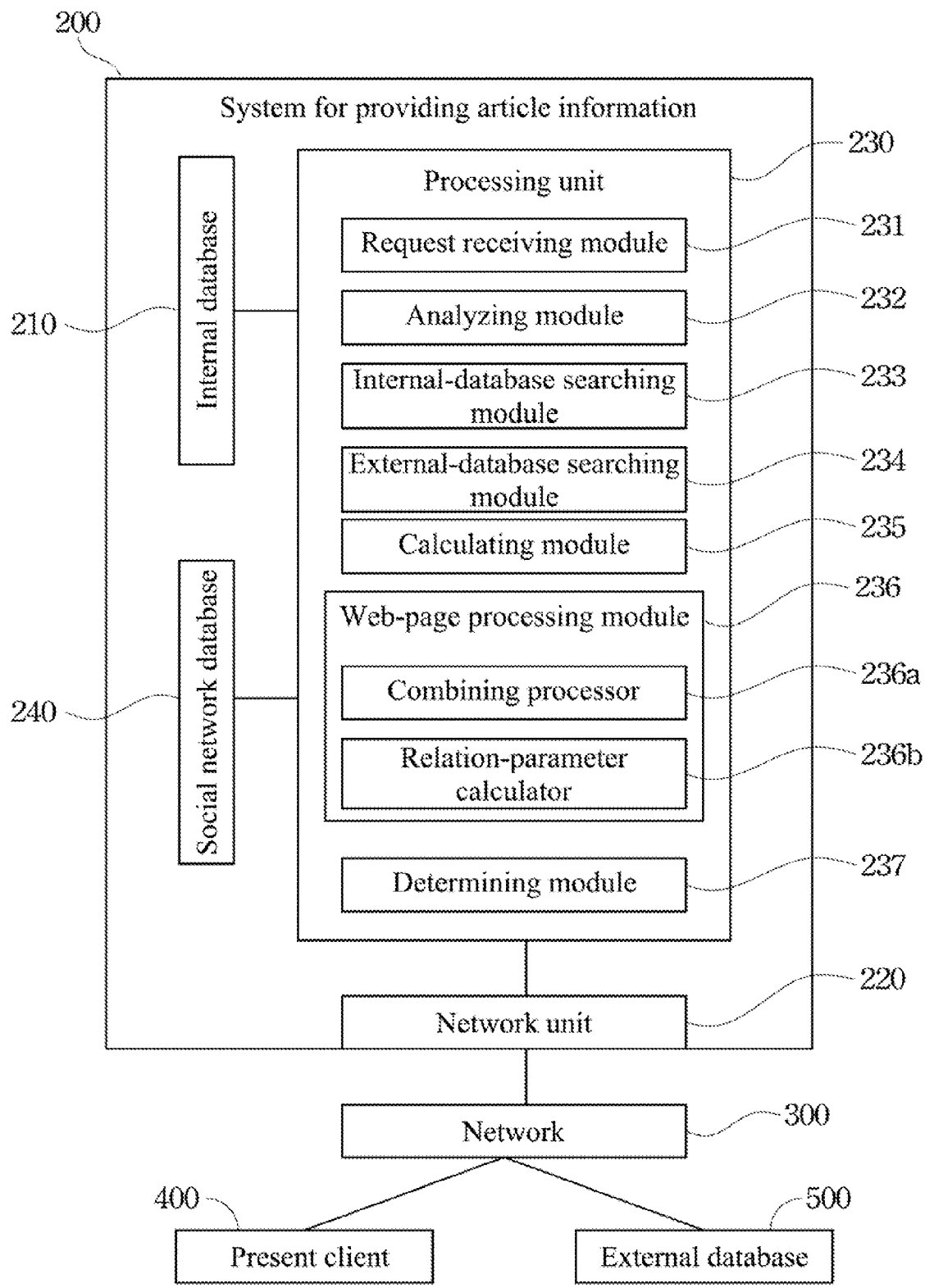
FIG. 2 illustrates a block diagram of a system for providing article information according to an embodiment of this invention.

FIG. 2 illustrates a block diagram of a system for providing article information according to an embodiment of this invention. The system for providing article information 200 includes an internal database 210, a network unit 220 and a processing unit 230. In some embodiments, the internal database 210, the network unit 220 and the processing unit 230 may be implemented in the same computer, server or any other electrical device. In some other embodiments, the internal database 210, the network unit 220 and the processing unit 230 may be discretely implemented in several computers, servers, other electrical devices or combination thereof.

The processing unit 230 is electrically connected to the internal database 210 and the network unit 220. The network unit 220 builds a connection with a network 300 utilizing a wired or wireless network protocol. In some embodiments of this invention, the internal database 210 may be set up utilizing a word level technology, which discovers relation of subordination between several preset words in the internal database 210. A word term, which is at the highest word level, can be taken as a representative keyword, which can represents a concept of the uppermost in its word category in the internal database 210.

The processing unit 230 includes a request receiving module 231, an analyzing module 232, an internal-database searching module 233, an external-database searching module 234, a calculating module 235 and a web-page processing module 236. The request receiving module 231 receives an article request for obtaining an article to be read through the network 300 from a present client 400. In other words, when a user of the present client 400 want to read an article, he/she can operate the present client 400 to generate the corresponding article request for the request receiving module 231 to receive.

The analyzing module 232 analyzes the article to obtain several potential keywords from the article. In one embodiment of this invention, the analyzing module 232 may utilize a word-segmentation algorithm to segment words captured from the article into several terms, which is taken as the potential keywords. In addition, the analyzing module 232 may further filter the terms, which are determined as nouns, to be taken as the potential keywords.

The internal-database searching module 233 searches the internal database 210 to obtain at least one representative keyword, which the potential words belong to, and transformation information between the at least one representative keyword and each potential keyword. In some embodiments, the internal-database searching module 233 may obtain the representative keyword, which represents the word category of the potential keywords, from the internal database 210. Since terms in one single article may be similar or the same, the number of the representative keyword obtained by the internal-database searching module 233 is less than or the same as the number of the potential keywords.

The external-database searching module 234 obtains a number of search results of the at least one representative keyword by searching for the at least one representative keyword in an external database 500 through the network 300. Therefore, there is no need to search the external database 500 for all potential keywords, which can reduce the number for searching the external database 500 and avoid being blocked by the external database 500 due to searching for too many times.

The calculating module 235 calculates a number of search results of each potential keyword according to the number of search results of the at least one representative keyword and the transformation information of each potential keyword respectively. In one embodiment of this invention, the transformation information of each potential keyword may include the ratio of the number of search results of the potential keyword to the number of search results of its representative keyword. Hence, the calculating module 235 calculates the number of search results of each potential keyword according to the ratio of the number of search results of each potential keyword to the number of search results of its representative keyword.

The web-page processing module 236 generates article-related information related to the article according to the number of search results of the potential keywords. Subsequently, the web-page processing module 236 combines the article with the article-related information to generate a web page, and transmits the web page to the present client 400 through the network 300. In some embodiments of this invention, the web-page processing module 236 may place the article-related information on the side of the article to form a web page. In another embodiment, the web-page processing module 236 may note the article-related information on the corresponding partition of the article. Therefore, the article to be read can be provided with its related information. In addition, with the internal database 210, the number for searching the external database can be reduced.

In some embodiments of this invention, the web-page processing module 236 may include a combining processor 236a and a relation-parameter calculator 236b. The combining processor 236a may combine the potential keywords to generate several potential keyword sets. The relation-parameter calculator 236b may calculate a word-relation parameter of each potential keyword set according to the number of search results of the potential keywords. Hence, the web-page processing module 236 selects one of the potential keywords for representing the article according to the word-relation parameters of the potential keyword sets, and searches the external database 500 utilizing the selected keyword for representing the article to obtain the article-related information related to the article.

In addition, when the internal-database searching module 233 performs its function, a determining module 237 of the processing unit 230 may determine if there is the at least one representative keyword, which each potential keyword belong to, stored in the internal database. When there is no representative keyword, which one of the potential keywords belong to, stored in the internal database, the processing unit 230 obtains the number of search results of the potential keyword belonging to no representative keyword by searching for the potential keyword belonging to no representative keyword in the external database 500 through the network 300.

Moreover, the present client 400 may join at least one social network, which includes social-network-member clients. The system for providing article information 200 may further include a social network database 240, which builds a connection with the processing unit 230. When at least one of the social-network-member clients performs an external search to the external database 500, the processing unit 230 records the result of the external search in the social network database 240. Hence, before the internal-database searching module 233, the external-database searching module 234 and the calculating module 235 start to perform their function, the processing unit 230 may obtain the number of search results of the potential keywords from the social network database 240.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for providing article information comprising:
   (a) receiving an article request for obtaining an article to be read through a network from a present client;
   (b) analyzing the article to obtain a plurality of potential keywords from the article;
   (c) searching an internal database to obtain at least one representative keyword, which the potential keywords belong to, and transformation information between the at least one representative keyword and each potential keyword;
   (d) obtaining a number of search results of the at least one representative keyword by searching for the at least one representative keyword in an external database;
   (e) calculating a number of search results of each potential keyword according to the number of search results of the at least one representative keyword and the transformation information of each potential keyword respectively, wherein the transformation information is the ratio of the number of search results of the potential keyword to the number of search results of its representative keyword;
   (f) generating article-related information related to the article according to the numbers of search results of the potential keywords; and
   (g) combining the article with the article-related information to generate a web page, and transmitting the web page to the present client through the network,
   wherein step (f) further comprises:
   combining the potential keywords to generate a plurality of potential keyword sets;
   calculating a word-relation parameter of each potential keyword set according to the number of search results of the potential keywords, wherein the word-relation parameter of each potential keyword set is a relation weight between the potential keywords of the same potential keyword set;
   selecting one of the potential keywords for representing the article according to the word-relation parameters of the potential keyword sets; and
   searching the external database utilizing the selected keyword for representing the article to obtain the article-related information related to the article.

2. The method for providing article information of claim 1 further comprising:
   determining if there is the at least one representative keyword, which each potential keyword belong to, stored in the internal database; and
   when there is no representative keyword, which one of the potential keywords belong to, stored in the internal database, obtaining the number of search results of the potential keyword belonging to no representative keyword by searching for the potential keyword belonging to no representative keyword in the external database.

3. The method for providing article information of claim 1 further comprising:
   obtaining information of at least one social network joined by the present client, wherein the social network comprises a plurality of social-network-member clients, the social network comprises a social network database;
   when at least one of the social-network-member clients performs an external search to the external database, recording the result of the external search in the social network database; and
   obtaining the number of search results of the potential keywords from the social network database.

4. A non-transitory computer readable storage medium with a computer program to execute a method for providing article information comprising:
   (a) receiving an article request for obtaining an article to be read through a network from a present client;
   (b) analyzing the article to obtain a plurality of potential keywords from the article;
   (c) searching an internal database to obtain at least one representative keyword, which the potential keywords belong to, and transformation information between the at least one representative keyword and each potential keyword;

(d) obtaining a number of search results of the at least one representative keyword by searching for the at least one representative keyword in an external database;

(e) calculating a number of search results of each potential keyword according to the number of search results of the at least one representative keyword and the transformation information of each potential keyword respectively, wherein the transformation information is the ratio of the number of search results of the potential keyword to the number of search results of its representative keyword;

(f) generating article-related information related to the article according to the numbers of search results of the potential keywords; and (g) combining the article with the article-related information to generate a web page, and transmitting the web page to the present client through the network, wherein step (f) further comprises:

combining the potential keywords to generate a plurality of potential keyword sets;

calculating a word-relation parameter of each potential keyword set according to the number of search results of the potential keywords, wherein the word-relation parameter of each potential keyword set is a relation weight between the potential keywords of the same potential keyword set;

selecting one of the potential keywords for representing the article according to the word-relation parameters of the potential keyword sets; and searching the external database utilizing the selected keyword for representing the article to obtain the article-related information related to the article.

\* \* \* \* \*